Sept. 6, 1960
H. J. SCHROEDER ET AL
2,951,393
MULTIPLE CONTROL MECHANISM
Filed Nov. 18, 1957
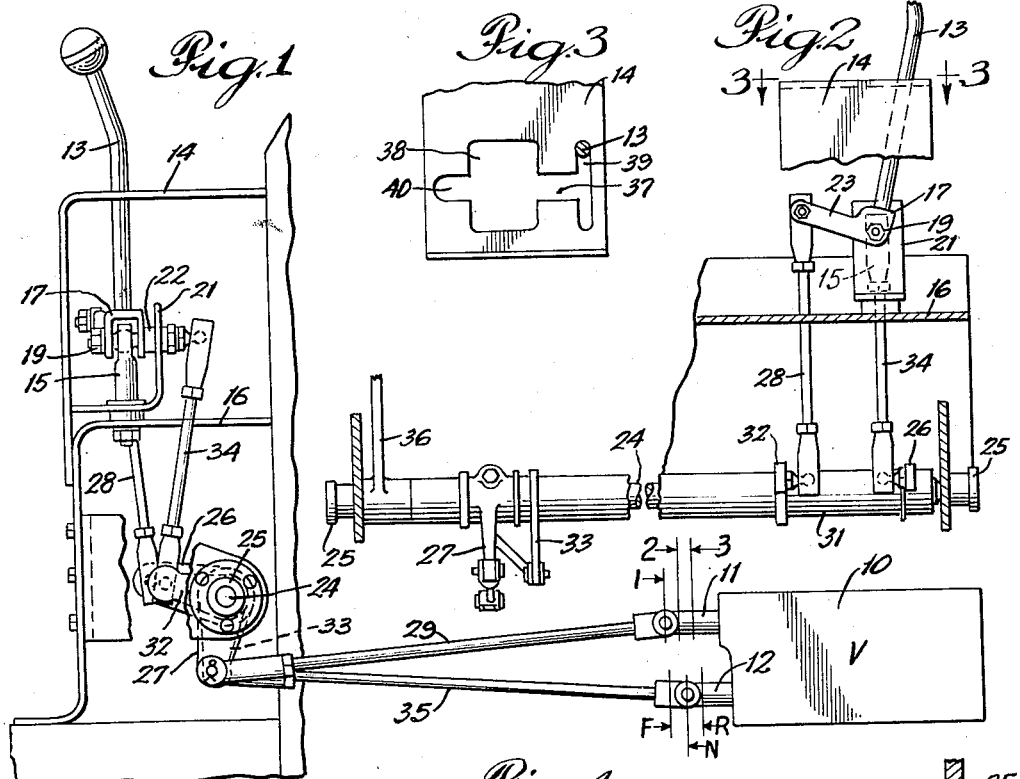
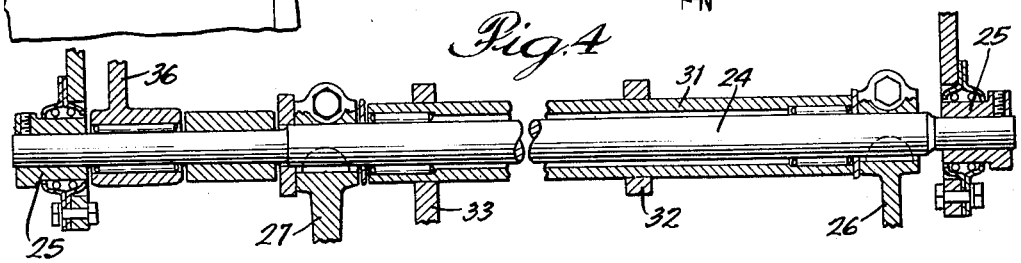
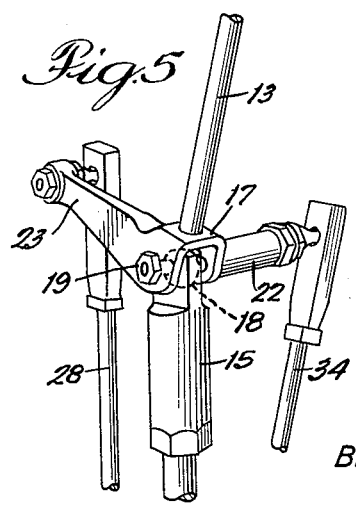
INVENTORS:
Harry Schroeder
and Robert J. Schroeder,
BY Bair, Freeman & Molinare
ATTORNEYS.

United States Patent Office 2,951,393
Patented Sept. 6, 1960

2,951,393

MULTIPLE CONTROL MECHANISM

Harry J. Schroeder, Milwaukee, Wis., and Robert J. Schroeder, Wheeling, Ill., assignors, by mesne assignments, to Allis-Chalmers Manufacturing Company, West Allis, Wis., a corporation of Delaware Filed Nov. 18, 1957, Ser. No. 697,237

3 Claims. (Cl. 74—473)

This invention relates to a multiple control mechanism and more particularly to a mechanism by which different control functions are accomplished by movement of a single control lever in different planes.

In tractors carrying controllable implements a large number of different control operations are required to control the direction and speed ratio of the tractor plus the several different movements of the implement. When separate control levers are provided for each separate operation a large number of levers result which produce a difficult mounting space problem and which may be confusing to the operator. To relieve this situation, it has been proposed to control a plurality of different functions through a single control lever movable in different planes.

The present invention relates to a control mechanism of this general type and particularly to a mechanism by which the transmission ratio of the tractor is controlled by movement of a lever in one plane transverse to the tractor and the direction of drive is controlled by movement of the same lever in any one of a plurality of planes longitudinally of the tractor.

It is an object of the invention to provide a multiple control mechanism which is simple to construct and mount and which is freely movable in different directions to perform different control operations.

According to a feature of the invention, a control lever is mounted for universal pivotal movement about a fixed point on the tractor and carries rigid arms at an angle to each other and connected respectively to control devices for controlling different operations.

Another object is to provide a multiple control mechanism in which guide means guide the lever for movement in one plane to control one function or operation and in a plurality of planes at an angle to said one plane to control other functions or operations.

A specific object is to provide a control mechanism for a tractor transmission in which the control lever is guided for movement in a plane transverse to the tractor to control the transmission ratio and in any one of a plurality of planes longitudinal of the tractor for controlling the direction of drive.

The above and other objects and features of the invention will be more readily apparent from the following description when read in connection with the accompanying drawing, in which:

Figure 1 is a partial view of a tractor and a transmission control therefor embodying the invention;

Figure 2 is a view of the control mechanism at right angles to Figure 1;

Figure 3 is a partial section on the line 3—3 of Figure 2 showing the guiding means;

Figure 4 is a section through the coaxial pivot rod; and

Figure 5 is a partial perspective view of the control lever mounting.

The control mechanism, as shown, is adapted to control the ratio and direction of drive of a tractor transmission which is shifted hydraulically through a valve mechanism shown generally at 10. The valve mechanism embodies a first shift rod 11 which is shiftable longitudinally to select a desired speed ratio and a second shift rod 12 which is shiftable longitudinally to select forward or reverse drive. As shown, the shift rod 11 is movable selectively to any one of three positions to select first, second or third speed ratio and the rod 12 when in its center position, as shown, selects neutral, when moved to the left selects forward drive, and reverse drive when moved to the right. This valve control is conventional on various tractors and will not be described in further detail since it, per se, forms no part of the present invention.

The transmission is adapted to be controlled by a single control lever 13 projecting through guide openings in an upper plate 14 forming a part of the transmission structure adjacent to the operator's seat. The control lever is mounted for universal pivotal movement at its lower end on a supporting post 15 rigidly mounted in the tractor structure and lying beneath the plate 14. The post 15 is rigidly secured to a cross frame element 16 and projects upward therefrom for universal mounting of the lower end of the control lever 13 thereon.

As best seen in Figure 5, the control lever 13 is rigidly secured to a yoke 17 which spans the upper end of the post 15. The post 15 is recessed at its upper end rotatably to receive a ball 18 and the yoke engages the opposite sides of the ball through recesses in its arms, one of which may be adjusted through a screw and locking nut 19. In this way, the lever is mounted for free universal pivoting on the upper end of the post 15 to move in any desired direction. Movement of the lever is confined to pivoting in planes transverse to and longitudinal of the tractor length and to assist in this a guide plate 21 formed with a central open slot therein is mounted adjacent to the lever and in longitudinal alignment therewith.

The yoke 17 carries two arms 22 and 23 projecting therefrom at a right angle and rigidly secured thereto. The arm 22 which extends longitudinally of the tractor may fit slidably in the slot in the plate 21 so that it can move freely vertically, but cannot swing laterally of the tractor. In this way, turning of the control lever and possible misalignment of the control linkage is prevented.

The arms 22 and 23 are connected respectively to bell crank levers on coaxial cross shafts through which they are in turn connected to the shift rods 11 and 12. The coaxial shafts, as shown in Figure 4, comprise a first shaft 24 extending transversely across the tractor and pivotally mounted at its ends in bearings 25 supported by the tractor frame. Adjacent one end a lever 26 is rigidly secured to the shaft 24 and adjacent the opposite end thereof a second lever 27 is secured to the shaft and extends at substantially a right angle to the lever 26. In this way, the levers 26 and 27 cooperating through the shaft 24 provide, in effect, a bell crank lever. The lever 26 is pivotally connected through a connecting rod 28 with the outer end of the arm 23 and a similar connecting rod 29 pivotally connects the end of the lever 27 with the end of the shift rod 11. The pivotal connections are preferably made through ball and socket type joints which will permit a limited degree of universal movement, especially insofar as the connections of the rod 28 are concerned.

A sleeve 31 is rotatably mounted on the shaft 24 and carries levers 32 and 33 rigidly secured thereto at spaced points in its length and lying at substantially a right angle to each other. These levers in cooperation with the sleeve 31 form in effect a bell crank mounted coaxially with the shaft 24. The lever 32 is connected through a connecting rod 34 with the outer end of the arm 22, the connections preferably being ball and socket type joints which will permit a limited extent of universal movement. The lever 33 is connected through a connecting rod 35 with the shift rod 12. As shown in Figure 4, the shaft 24 may also provide a convenient mounting for additional levers, as illustrated at 36.

Movements of the control lever 13 are guided in the desired planes so that selection of transmission ratios and of direction of drive can be properly made without any possibility of confusion. For this purpose, as best seen in Figure 3, the plate 14 is formed with a guide slot having an elongated transverse opening 37 therein and a pair of slots 38 and 39 crossing the slot 37. The lever 13 extends through the guide slot and may terminate above the plate 14 in a convenient handle to be grasped by the operator. The opening 37 projects beyond the slot 38 to provide a notch 40 and when the lever 13 is in this notch the transmission is in neutral. The slot 38 is relatively wide so that when the lever is in the left side thereof the transmission is in first and is in second when the lever is in the right side thereof to facilitate rapid shifting between these ratios. When the lever is in the slot 39, the transmission is in third or high speed drive.

In use the operator may move the control lever 13 transversely of the tractor through the transverse slot 37 and when it is in alignment with one of the slots 38 or 39, he may shift it forward or backward to select the desired direction of drive. When the lever is swung transversely through the slot 37 it will pivot about the ball 18 and will cause the arm 23 to swing in a vertical plane. At this time, the arm 22 will simply turn about its own axis, which is coincident with the center of the universal mounting, and will not cause any movement of the connecting rod 34. However, vertical swinging of the arm 23 will shift the connecting rod 28 longitudinally of its length and through the linkage described above will move the shift rod 11 longitudinally to select either first, second or third speed ratio. The operator may move the control lever forward into the forward end of the registering slot 38 or 39 to select forward drive or may move it rearwardly to select rear drive. When the control lever is moved forward or to the left, as seen in Figure 1, the arm 22 will be rocked upward and through the linkage described above will move the control rod 12 to the left to the forward position shown. When the control lever is moved rearwardly, it will shift the control rod to the right to select reverse drive. It will be seen that either forward or reverse can be selected in any one of the several driving ratios and that shifts between first and second can be made quickly simply by swinging the lever from one side to the other of the wide slot 38.

The control mechanism of the present invention can be easily and simply mounted on a tractor and will be freely movable and easy to maintain at all times since all of the movements involved are pivotal movements between different linkage elements. The only sliding movements involved are those of the control lever in the guide slots and these can be made sufficiently free so that there will be no likelihood of binding.

While one embodiment of the invention has been shown and described herein, it will be understood that it is illustrative only and not to be taken as a definition of the scope of the invention, reference being had for this purpose to the appended claims.

What is claimed is:

1. A multiple control mechanism comprising a fixed support, a control lever mounted on the support for pivotal movement about a point in two intersecting planes, a pair of arms rigidly secured to the control lever with their axes passing through said point and extending perpendicular to the lever and to said planes respectively, guide means engaging one of the arms remote from the lever and guiding it for pivotal movement in a plane perpendicular to the other arm, and control rods pivotally connected to the arms respectively to be shifted selectively as the lever is swung selectively in said planes.

2. A multiple control mechanism comprising a support, a control lever mounted at one end for universal pivotal movement about a point on the support, a pair of arms rigidly secured to the lever at said one end and perpendicular to the lever and to each other and with their axes passing through said point, guide means engaging one of the arms remote from the lever and guiding it for pivotal movement in a plane perpendicular to the other arm, and control rods pivotally connected to the arms respectively to be selectively shifted as the control lever is swung in different directions.

3. A multiple control mechanism in combination with a tractor having a transmission including a first control device shiftable to select one of a plurality of transmission ratios and a second control device shiftable to select forward or reverse drive, said control mechanism comprising a control lever mounted for universal pivotal movement about a fixed point on the tractor, a pair of arms rigidly secured to the lever at a right angle to each other and to the lever with their axes passing through said point, guide means engaging one of the arms remote from the lever and guiding it for pivotal movement in a plane perpendicular to the other arm, and means connecting the arms to the control devices respectively.

References Cited in the file of this patent

UNITED STATES PATENTS

| 889,897 | Bramley-Moore | June 9, 1908 |
| 1,073,775 | Michaud | Sept. 23, 1913 |
| 1,358,730 | Hartsough | Nov. 16, 1920 |
| 1,843,272 | Evinrude | Feb. 2, 1932 |
| 2,219,601 | Quartullo | Oct. 29, 1940 |
| 2,624,212 | Urquhart | Jan. 6, 1953 |

FOREIGN PATENTS

| 142,500 | Sweden | Oct. 13, 1953 |
| 1,009,222 | France | Mar. 5, 1952 |